(12) United States Patent
Kolodziej et al.

(10) Patent No.: US 7,811,713 B2
(45) Date of Patent: Oct. 12, 2010

(54) THERMAL CONTROL OF CATHODE INLET AIR FLOW FOR A FUEL CELL SYSTEM

(75) Inventors: Jason R. Kolodziej, West Henrietta, NY (US); Seth E. Lerner, Honeoye Falls, NY (US); Prem C. Menon, Pittsford, NY (US); Steven D. Burch, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 979 days.

(21) Appl. No.: 11/634,564

(22) Filed: Dec. 6, 2006

(65) Prior Publication Data

US 2008/0138671 A1    Jun. 12, 2008

(51) Int. Cl.
*H01M 8/04* (2006.01)
*H01M 8/08* (2006.01)
(52) U.S. Cl. .................... 429/435; 429/413; 429/442
(58) Field of Classification Search .................. 429/24, 429/26, 13
See application file for complete search history.

(56) References Cited

U.S. PATENT DOCUMENTS

| 6,849,352 | B2 | 2/2005 | Formanski et al. | |
| 7,592,083 | B2* | 9/2009 | Meltser et al. | 429/26 |
| 2006/0099469 | A1* | 5/2006 | Meltser et al. | 429/24 |

FOREIGN PATENT DOCUMENTS

CN    1770534 A    5/2006

* cited by examiner

*Primary Examiner*—Patrick Ryan
*Assistant Examiner*—Thomas H. Parsons
(74) *Attorney, Agent, or Firm*—Fraser Clemens Martin & Miller LLC; J. Douglas Miller

(57) ABSTRACT

A method and apparatus for thermal control of air flow in a fuel cell system, capable of accurately controlling the temperature of the air stream entering the water vapor transfer unit, maintaining a desired temperature set-point, and minimizing the time required for the air stream to reach the optimum operating temperature.

11 Claims, 3 Drawing Sheets

1

THERMAL CONTROL OF CATHODE INLET AIR FLOW FOR A FUEL CELL SYSTEM

FIELD OF THE INVENTION

This invention relates to a method of operation of a fuel cell system. More particularly, this invention is directed to a method and apparatus for thermal control of cathode inlet airflow in a hydrogen fuel cell.

BACKGROUND OF THE INVENTION

In most modern fuel cell systems, a compressor provides compressed air to a fuel cell stack, and a water vapor transfer unit humidifies the compressed air before it enters the fuel cell stack. The temperature of the air stream exiting the compressor, at the air mass flow rates required for fuel cell operation, are typically beyond the desirable thermal limit of the water vapor transfer unit.

A control system typically employs a heat exchanger to keep the temperature of the air stream exiting the compressor below the thermal limit of the water vapor transfer unit.

In such fuel cell systems coolant flow to the heat exchanger cannot be stopped. There are situations where it may be desirable to heat the air stream entering the cathode, such as starting the fuel cell, but the coolant entering the heat exchanger is at a lower temperature and cools the air. Therefore, the time required to reach a desired operating temperature is unnecessarily extended. Additionally, such fuel cell systems do not maintain active control of the air stream entering the water vapor transfer unit, and are not capable of maintaining a desired temperature. This prohibits the water vapor transfer unit from performing at an optimum level.

It would be desirable to develop a method and apparatus for accurately controlling the temperature of the air stream entering the water vapor transfer unit, which would maintain a desired temperature and minimize the time required for the air stream to reach a desired operating temperature.

SUMMARY OF THE INVENTION

According to the present invention a method and apparatus for controlling the temperature of the air stream entering the water vapor transfer unit in a fuel cell system has surprisingly been discovered. This method maintains a desired temperature of the air stream entering the water vapor transfer unit, and minimizes the time required for the air stream to reach an optimum operating temperature.

In one embodiment, the method for thermal control of air flow in a fuel cell system includes the steps of: providing a system coolant loop fluidly connected to a heat exchanger, the heat exchanger fluidly connected to a fuel cell stack, and the system coolant loop containing a first fluid; determining an actual temperature of the air flow at a predetermined point in the fuel cell system; determining a desired temperature of the air flow at the predetermined point; and controlling the flow of at least a portion of the first fluid from the system coolant loop to the heat exchanger as a function of the actual temperature of the air flow and the desired temperature of the air flow at the predetermined point to achieve the desired temperature.

In another embodiment, the method for thermal control of air flow in a fuel cell system includes the steps of: providing a fuel cell stack, a first fluid, a system coolant loop, a heat exchanger, at least one water vapor transfer unit, a first valve, a second valve, and a secondary cooling heat exchanger; determining an actual temperature of an air flow at an inlet of the water vapor transfer units; determining a desired temperature of the air flow as a function of the temperature at which the water vapor transfer units operate with maximum efficiency; and controlling the flow of at least a portion of the first fluid from the system coolant loop to the heat exchanger with the first valve and the second valve to achieve the desired temperature, wherein the first valve when open directs a portion of the first fluid from the system coolant loop into the heat exchanger, and the second valve when open directs the coolant from the system coolant loop into the secondary cooling heat exchanger before the coolant enters the heat exchange.

In another embodiment, the apparatus for thermal control of air flow in a fuel cell system includes an air compressor fluidly connected to a cathode side of a fuel cell stack via a first conduit, a heat exchanger disposed in the first conduit between the air compressor and cathode side of the fuel cell stack, at least one water vapor transfer unit disposed in the first conduit between the heat exchanger and the cathode side of the fuel cell stack, a temperature sensor disposed in the conduit between the heat exchanger and water vapor transfer units, a valve array fluidly connected to the heat exchanger via a second conduit, and a system coolant loop via a third conduit, a secondary cooling heat exchanger fluidly connected to the valve array via a fourth conduit and the heat exchanger via the second conduit, a control system in electrical communication with the valve array via a first connection, and in electrical communication with the temperature sensor via a second connection, wherein the control system is responsive to an electrical signal received from the temperature sensor and selectively influences the valve array to direct a first fluid from the system coolant loop into at least one of the heat exchanger and secondary cooling heat exchanger to achieve a desired temperature of air leaving the conduit and entering the water vapor transfer units.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
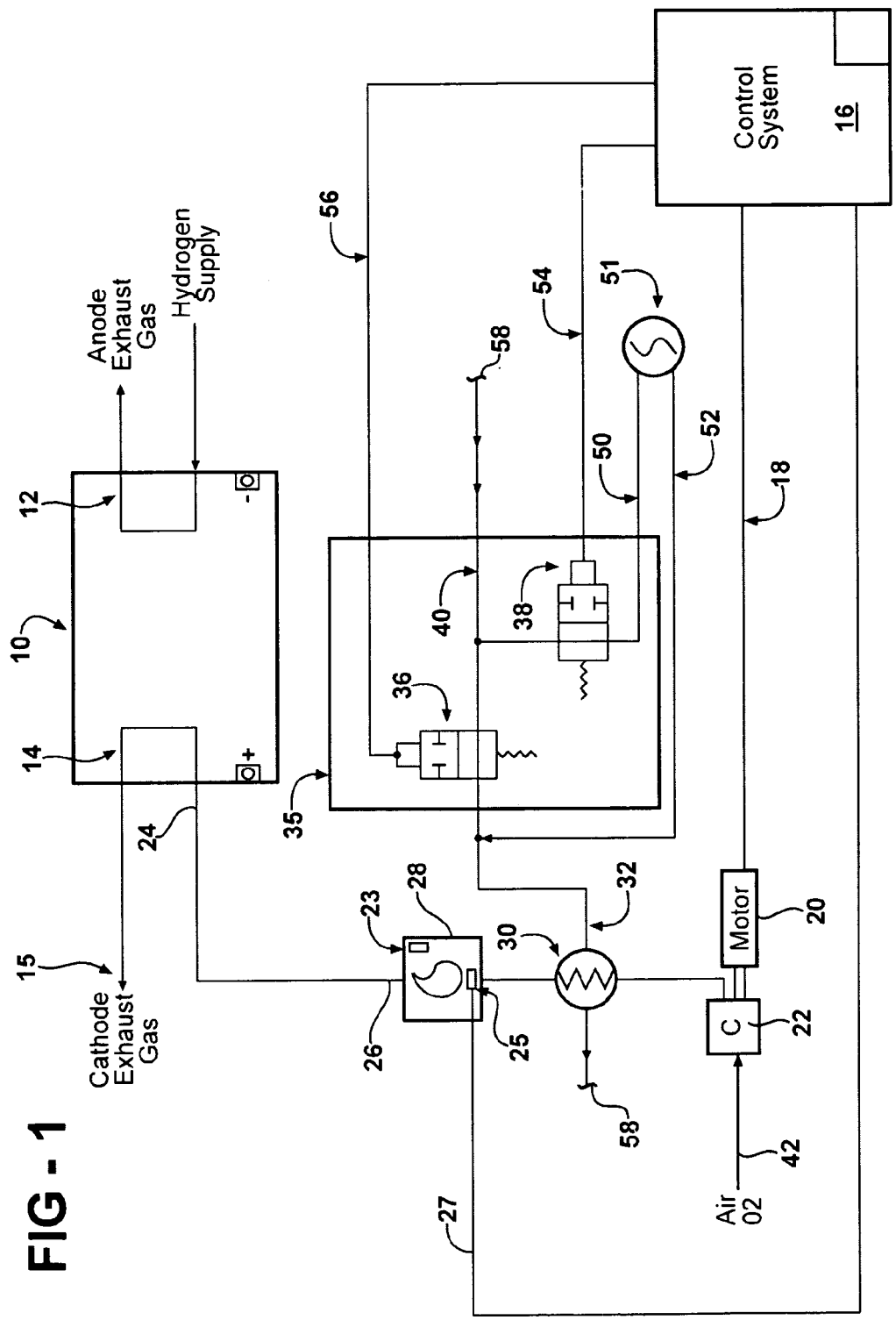
FIG. 1 is a schematic diagram of a fuel cell system according to an embodiment of the invention.

Referring now to FIG. 1, a basic layout of a fuel cell system with associated components is shown; in practice many variants are possible. A schematic representation of a fuel cell stack 10 integrated into a fuel cell system and consisting of a plurality of individual fuel cells which are connected electrically in series is shown. It is further understood that the individual fuel cells can be connected electrically in parallel without departing from the scope of this invention. The anode sides of all individual fuel cells of the fuel cell stack 10 are connected together in a manner commonly known in the art, with the resulting anode side of the stack being designated with the reference numeral 12. In a similar manner, the cathode sides of the fuel cells of the fuel cell stack 10 are connected together in a manner commonly known in the art with the resulting cathode side of the stack being designated with the reference numeral 14. The operation of various types of fuel cell systems are commonly known in the art; one embodiment can be found in commonly owned U.S. Pat. No. 6,849,352, hereby incorporated herein by reference in its entirety. Therefore, only the operation of a fuel cell system as pertinent to this invention will be explained in the description.

In the exemplary embodiment described herein, the fuel cell system includes a control system 16. The control system 16 is electrically linked via a connection 18 to a motor 20. The connection 18 may be any conventional means of electrical communication. The motor 20 is coupled with a compressor 22. The compressor 22 is in fluid communication with a cathode inlet 24 of the fuel cell stack 10 via an air supply conduit 26. The conduit 26 can be any conventional conduit providing a sealed passageway.

Figure 4:
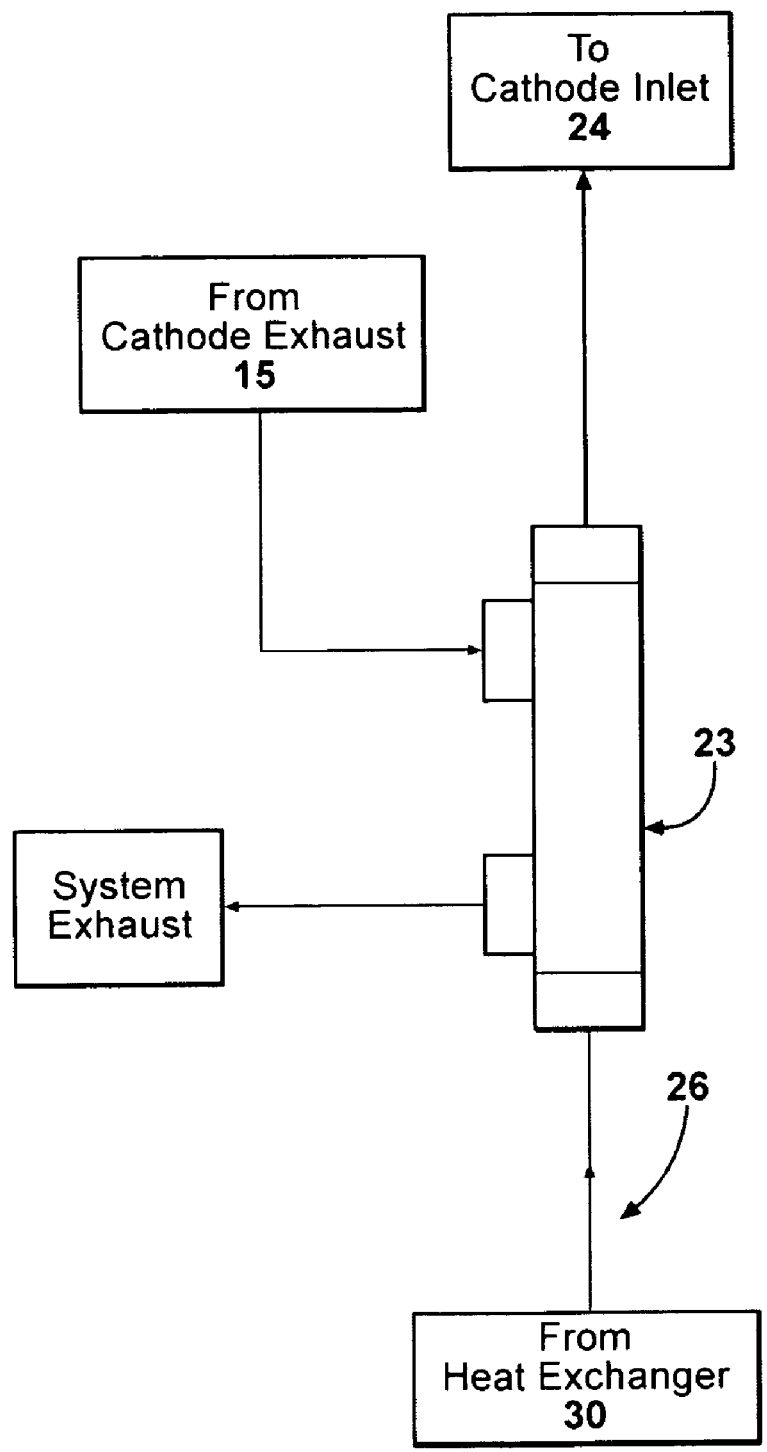
FIG. 4. is a fragmentary perspective view of a water vapor transfer unit and shows associated components schematically according to the embodiment of the invention shown in FIG. 1.

A humidifier 28 is disposed in the conduit 26 between the compressor 22 and the cathode inlet 24. The humidifier 28 includes at least one water vapor transfer unit 23, and an inlet temperature sensor 25. The inlet temperature sensor 25 is in electrical communication with the control system 16 via a connection 27. The water vapor transfer unit 23 is in fluid communication with a cathode exhaust 15, and a system exhaust, as shown in FIG. 4.

A heat exchanger 30 is disposed in the conduit 26 between the compressor 22 and the humidifier 28. The heat exchanger 30 is in fluid communication with a valve array 35 via a conduit 32. The valve array 35 includes a bypass valve 36 and a cooling valve 38. The bypass valve 36 is in fluid communication with a fuel cell system coolant loop 58, and the cooling valve 38 via a conduit 40. An exhaust conduit 31 fluidly connects the heat exchanger 30 and the fuel cell system coolant loop 58.

The control system 16 is in electrical communication with the bypass valve 36 via a connection 56, and is in electrical communication with the cooling valve 38 via a connection 54.

The cooling valve 38 is in fluid communication with a secondary cooling heat exchanger 51 via a conduit 50. The secondary cooling heat exchanger 51 is in fluid communication with the heat exchanger 30 via a conduit 52. The secondary cooling heat exchanger 51 can be any properly sized cooling heat exchanger, such as a wheel house radiator.

In operation, air is supplied to the compressor 22 via a conduit 42. The compressor 22 is driven by the motor 20. The air compressed by the compressor 22 is supplied via the conduit 26 through the heat exchanger 30 and the humidifier 28 to the cathode inlet 24 of the fuel cell stack 10.

A temperature of the compressed air exiting the compressor 22 is typically above a desired temperature for efficient operation of the water vapor transfer unit 23. At flow rates normally necessary for fuel cell operation, air leaving the compressor 22 is typically about 120 degrees Celsius. The acceptable thermal limit of the water vapor transfer unit 23 in the embodiment shown is approximately 90 degrees Celsius.

The heat exchanger 30 influences the temperature of the air traveling through the heat exchanger 30 in a manner commonly known in the art. Coolant (not shown) enters the heat exchanger 30 via the conduit 32. The temperature and flow of coolant cycling through the heat exchanger 30 is controlled to reach the desired temperature of the air. Typically, during normal operation when the ambient temperature is approximately 20 degrees Celsius, the coolant is maintained at about 60 to 80 degrees Celsius.

The water vapor transfer unit 23 humidifies the air prior to delivery to the fuel cell stack 10, by transferring moisture from a portion of air in the cathode exhaust 15 to the air stream in the conduit 26. It is desirable to control the humidity of the air to optimize the operation of the fuel cell stack 10. Additionally, it is desirable to maintain an air temperature entering the humidifier 28 and the water vapor transfer unit 23 in order to aid in the humidification process. The temperature of the air entering the humidifier 28 is measured by the inlet temperature sensor 25, and communicated to the control system 16 via the connection 27.

In the embodiment shown herein, the valve array 35, including the valves 36,38, maintains a desired air temperature entering the humidifier 28 and the water vapor transfer unit 23. A portion of the coolant that is used to cool the entire fuel cell system enters the valve array 35 from the fuel cell system coolant loop 58. The control system 16 positions the bypass valve 36 via the connection 56, and positions the cooling valve 38 via the connection 54. The bypass valve 36 selectively causes the coolant to bypass the secondary cooling heat exchanger 51 and to enter the heat exchanger 30. The cooling valve 38 selectively causes the coolant to flow to the secondary cooling heat exchanger 51 via the conduit 50, before the coolant enters the heat exchanger 30 via the conduit 52. The coolant is returned to the fuel cell system coolant loop 58 via the exhaust conduit 31 after traversing the heat exchanger 30. A desired temperature of the air stream entering the humidifier 28 is maintained by balancing the coolant flow through the valves 36, 38 with the controller 16. It is further understood that the valve array 35 can contain different quantities and arrangements of valves without departing from the scope of this invention.

In this embodiment, it is first necessary to select how long the bypass valve 36 and the cooling valve 38 are open, similar to a slow duty cycle approach, in order to balance the coolant flow through the valves 36,38 and maintain a desired temperature of the air stream entering the humidifier 28. For example if the maximum valve open time is four seconds, a 75% duty cycle on the valve is equivalent to three seconds open and one second closed. For the purpose of explaining the current invention it is assumed a maximum open time has been chosen and the controls will only be discussed in terms of duty cycles.

Figure 2:
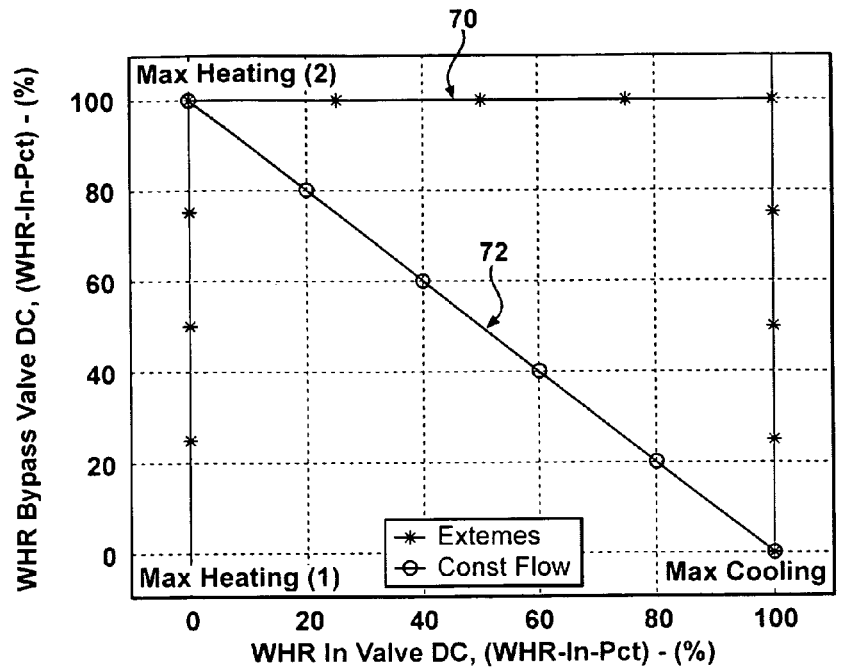
FIG. 2 is a graph showing a plot of valve commands as a percentage of the total duty cycle for the fuel cell system illustrated in FIG. 1.

In FIG. 2, an extreme limit of valve command method 70 is shown, wherein the system controller 16 does not maintain a constant coolant flow through the heat exchanger 30. It may be desirable not to maintain a constant coolant flow in some situations such as starting the fuel cell stack 10 from a cold condition.

For example, as shown in Table 1, if the temperature of the air entering the heat exchanger 30 is higher than the temperature of the coolant in the system coolant loop 58 the control system 16 implements Max Heating (1) in Table 1. A 0% duty cycle for the bypass valve 38, and a 0% duty cycle for the cooling valve 36 restrict the flow of coolant from the fuel cell system coolant loop 58 to the heat exchanger 30, allowing the warmer air to enter the humidifier 28 without being cooled by the lower temperature coolant.

TABLE 1

|  | PID Control Output | Bypass Valve % | Cooling Valve % |
|---|---|---|---|
| Max Heating (1) | 0% | 0% | 0% |
|  | 8% | 25% | 0% |
|  | 17% | 50% | 0% |
|  | 25% | 100% | 0% |
| Max Heating (2) | 33% | 100% | 0% |
|  | 42% | 100% | 25% |
|  | 50% | 100% | 50% |
|  | 58% | 100% | 75% |
|  | 67% | 100% | 100% |
|  | 75% | 75% | 100% |
|  | 83% | 50% | 100% |
|  | 92% | 25% | 100% |
| Max Cooling | 100% | 0% | 100% |

It may be further desirable for the control system 16 to implement Max Heating (1) in Table 1, to improve efficiency and fuel consumption when the fuel cell system is operating at low power or idling. The temperature of the air compressed by the compressor 22 typically does not increase substantially over the ambient temperature, and remains lower than the temperature of the coolant in the heat exchanger 30 when the fuel cell system is operating at low power or idling. Typically, the fuel cell system is required to use extra fuel to maintain fuel cell stack 10 temperature during idling and low power operation, because the cooler air entering the heat exchanger 30 decreases the temperature of the coolant in the fuel cell system coolant loop 58. Implementing Max Heating (1) restricts the flow of coolant from the fuel cell system coolant loop 58 to the heat exchanger 30, allowing the cooler air to enter the humidifier 28 without reducing the temperature of the coolant in the fuel cell system coolant loop 58. The temperature of the air in the conduit 26 will be increased when the moisture from the gas in the cathode exhaust 15 is transferred to the air in the water vapor transfer unit 23.

If the temperature of the coolant within the system coolant loop 58 is greater than the temperature of the air entering the heat exchanger 30 then the control system 16 controls the valve array 35 using Max Heating (2) in Table 1. A 100% duty cycle for the bypass valve 38, and a 0% duty cycle for the cooling valve 36, allows the coolant from the system coolant loop 58 to enter the heat exchanger 30 without passing through the secondary cooling heat exchanger 51, and thus bring the temperature of the air up before it enters the humidifier 28. FIG. 2 illustrates the valve duty cycles for the extreme limit of valve command method 70.

In alternative embodiments the extreme limit of valve command method 70 of controlling the valve array 35 may be implemented using a proportional-integral-derivative controller, commonly referred to as a PID controller (not shown). Table 1, shows the conversion of the control output of the PID controller to the duty cycle of the bypass valve 36 and the cooling valve 38 that the control system 16 implements. The PID controller output is a saturation type control between Max Heating (1) and Max Cooling. When the coolant temperature of the system coolant loop 58 is greater than the air temperature out of the compressor 22, the PID controller begins with Max Heating (2).

Figure 3:
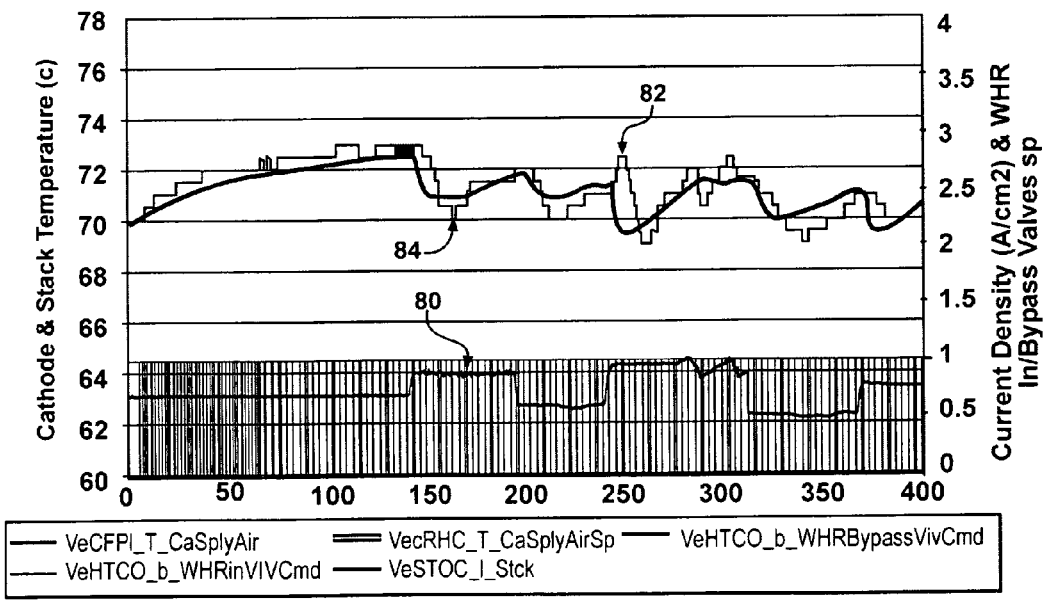
FIG. 3 is a graph showing a plot of the desired cathode air set-point of the fuel cell system illustrated in FIG. 1 compared to the actual temperature control in degrees Celsius versus time.

FIG. 3 shows the results of the extreme limit of valve command control methodology when a fuel cell system current density 80 is changed randomly from 0.5 A/cm$^2$ to 1 A/cm$^2$. FIG. 3 demonstrates that a desired cathode air temperature 84 closely tracks a temperature control 82, and the extreme limit of valve command method 70 produces desirable results.

FIG. 2 also shows a graph of the cooling valve 38 and the bypass valve 36 duty cycles for an alternative control method, a synchronous actuation control method 72, wherein the control system 16 maintains a constant coolant flow through the heat exchanger 30. Synchronous actuation of the cooling valve 38 and the bypass valve 36 is desirable in order to maintain a constant flow of coolant through the heat exchanger 30.

For example, if the desired control is a 25% duty cycle for the bypass valve 36 and a 75% duty cycle for the cooling valve 38, then the bypass valve 36 is only open for the first 25% of the total duty cycle, and the cooling valve 38 is only open for the remaining 75% of the total duty cycle in order to ensure there is a constant flow of coolant to the heat exchanger 30.

The synchronous actuation control method 72 is application dependent, and may be desirable if the heat exchanger 30 requires constant coolant flow for optimal effectiveness.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for thermal control of air flow in a fuel cell system, the method of comprising the steps:
   (a). providing a fuel cell stack, a fluid in a system coolant loop, a heat exchanger connected to at least one water vapor transfer unit, a first valve, a second valve, and a secondary cooling heat exchanger;
   (b). determining an actual temperature of an air flow at an inlet of the water vapor transfer unit;
   (c). determining a desired temperature of the air flow as a function of the temperature at which the water vapor transfer unit operates with maximum efficiency; and
   (d). controlling the flow of at least a portion of the fluid from the system coolant loop to the heat exchanger with the first valve and the second valve to achieve the desired temperature, wherein the first valve when open directs a portion of the fluid from the system coolant loop into the heat exchanger, and the second valve when open directs the fluid from the system coolant loop directly into the secondary cooling heat exchanger before the fluid enters the heat exchanger.

2. The method according to claim 1, including performing said step (b) with a temperature sensor connected in the air flow path at the inlet of the water vapor transfer unit.

3. The method according to claim 1, wherein the fluid is coolant.

4. The method according to claim 1, wherein the first valve is a bypass valve.

5. The method according to claim 4, wherein the second valve is a cooling valve.

6. The method according to claim 5, wherein the secondary cooling heat exchanger is a wheel house radiator.

7. The method according to claim 1, including performing step (d) by controlling the first valve and the second valve with an extreme limit of valve command methodology.

8. The method according to claim 7, wherein the extreme limit of valve command methodology is implemented using a proportional-integral-derivative controller.

9. The method according to claim 1, including performing step (d) by controlling the first valve and the second valve with a synchronous actuation control method.

10. An apparatus for thermal control of air flow in a fuel cell system, comprising:
- an air compressor fluidly connected to a cathode side of a fuel cell stack via a first conduit;
- a heat exchanger disposed in the first conduit between the air compressor and the cathode side of the fuel cell stack;
- at least one water vapor transfer unit disposed in the first conduit between the heat exchanger and the cathode side of the fuel cell stack;
- a temperature sensor disposed in the conduit between the heat exchanger and the at least one water vapor transfer unit;
- a valve array fluidly connected to the heat exchanger via a second conduit, and to a system coolant loop via a third conduit, wherein the valve array includes a first valve and a second valve;
- a secondary cooling heat exchanger fluidly connected to the valve array via a fourth conduit and to the heat exchanger via the second conduit, wherein the first valve when open directs a portion of the fluid from the system coolant loop into the heat exchanger, and the second valve when open directs the fluid from the system coolant loop directly into the secondary cooling heat exchanger before the fluid enters the heat exchanger;
- a control system in electrical communication with the valve array via a first connection, and in electrical communication with the temperature sensor via a second connection, wherein the control system is responsive to an electrical signal received from the temperature sensor and selectively influences the valve array to direct a fluid from the system coolant loop into at least one of the heat exchanger and secondary cooling heat exchanger to achieve a desired temperature of air leaving the heat exchanger and entering the at least one water vapor transfer unit, wherein the desired temperature of the air flow is a function of the temperature at which the water vapor transfer unit operates with maximum efficiency.

11. The apparatus according to claim 10, wherein the first valve is a bypass valve and the second valve is a cooling valve.

* * * * *